United States Patent
Levesque et al.

(10) Patent No.: US 10,234,945 B2
(45) Date of Patent: Mar. 19, 2019

(54) COMPENSATED HAPTIC RENDERING FOR FLEXIBLE ELECTRONIC DEVICES

(71) Applicant: IMMERSION CORPORATION, San Jose, CA (US)

(72) Inventors: Vincent Levesque, San Jose, CA (US); Ali Modarres, San Jose, CA (US); William S. Rihn, San Jose, CA (US)

(73) Assignee: IMMERSION CORPORATION, San Jose, CA (US)

(*) Notice: Subject to any disclaimer, the term of this patent is extended or adjusted under 35 U.S.C. 154(b) by 0 days.

(21) Appl. No.: 15/261,447

(22) Filed: Sep. 9, 2016

(65) Prior Publication Data
US 2018/0074585 A1 Mar. 15, 2018

(51) Int. Cl.
G06F 3/01 (2006.01)
G06F 3/041 (2006.01)
G06F 3/0487 (2013.01)

(52) U.S. Cl.
CPC .............. *G06F 3/016* (2013.01); *G06F 3/017* (2013.01); *G06F 3/0414* (2013.01); *G06F 3/0487* (2013.01); *G06F 2203/04102* (2013.01)

(58) Field of Classification Search
None
See application file for complete search history.

(56) References Cited

U.S. PATENT DOCUMENTS

| | | | |
|---|---|---|---|
| 6,629,341 B2 | 10/2003 | Wilkie et al. | |
| 6,924,787 B2 | 8/2005 | Kramer et al. | |
| 7,196,688 B2 | 3/2007 | Schena | |
| 7,339,572 B2 | 3/2008 | Schena | |
| 7,511,706 B2 | 3/2009 | Schena | |
| 7,561,141 B2 | 7/2009 | Shahoian et al. | |
| 7,679,611 B2 | 3/2010 | Schena | |
| 7,924,144 B2 | 4/2011 | Makinen et al. | |
| 8,004,492 B2 | 8/2011 | Kramer et al. | |
| 8,174,372 B2 | 5/2012 | da Costa | |
| 8,390,594 B2 | 3/2013 | Modarres et al. | |

(Continued)

FOREIGN PATENT DOCUMENTS

| CN | 102662477 A | 9/2012 |
|---|---|---|
| EP | 2778843 A2 | 9/2014 |

(Continued)

OTHER PUBLICATIONS

OPENMATERIALS, "Quantum tunnelling composite," Retrieved from http://openmaterials.org/materials-101-quantum-tunnelling-composite/ on Apr. 11, 2016, 4 pages.

(Continued)

*Primary Examiner* — Joseph R Haley
(74) *Attorney, Agent, or Firm* — Miles & Stockbridge, P.C.

(57) ABSTRACT

A device comprises a housing, a sensor, a controller and an actuator. The sensor is configured to detect a contact force exerted on the housing. The controller is communicatively coupled to the sensor and is configured to determine a change in a haptic effect caused by the contact force. The controller is additionally configured to generate an output instruction to deliver the haptic effect in a compensated form that is operable to correct the change. The actuator is configured to receive the output instruction and deliver the compensated haptic effect at the housing.

18 Claims, 8 Drawing Sheets

(56) References Cited

U.S. PATENT DOCUMENTS

| | | |
|---|---|---|
| 8,405,618 B2 | 3/2013 | Colgate et al. |
| 8,659,210 B2 | 2/2014 | Jiang et al. |
| 8,780,053 B2 | 7/2014 | Colgate et al. |
| 8,791,902 B2 | 7/2014 | Colgate et al. |
| 8,836,664 B2 | 9/2014 | Colgate et al. |
| 8,976,501 B2 | 3/2015 | Smoot et al. |
| 9,535,550 B2* | 1/2017 | Levesque .............. G06F 3/0487 |
| 9,720,502 B2* | 8/2017 | Xu ........................... G06F 3/016 |
| 2007/0236450 A1 | 10/2007 | Colgate et al. |
| 2008/0088580 A1 | 4/2008 | Poupyrev et al. |
| 2008/0303782 A1 | 12/2008 | Grant et al. |
| 2009/0128503 A1 | 5/2009 | Grant et al. |
| 2009/0250267 A1 | 10/2009 | Heubel et al. |
| 2009/0284485 A1 | 11/2009 | Colgate et al. |
| 2009/0322496 A1 | 12/2009 | da Costa |
| 2010/0085169 A1 | 4/2010 | Poupyrev et al. |
| 2010/0108408 A1 | 5/2010 | Colgate et al. |
| 2010/0141407 A1 | 6/2010 | Heubel et al. |
| 2010/0231367 A1 | 9/2010 | Cruz-Hernandez et al. |
| 2010/0231508 A1 | 9/2010 | Cruz-Hernandez et al. |
| 2010/0231539 A1 | 9/2010 | Cruz-Hernandez et al. |
| 2010/0231540 A1 | 9/2010 | Cruz-Hernandez et al. |
| 2010/0231541 A1 | 9/2010 | Cruz-Hernandez et al. |
| 2010/0231550 A1 | 9/2010 | Cruz-Hernandez et al. |
| 2010/0283727 A1 | 11/2010 | Jiang et al. |
| 2010/0283731 A1 | 11/2010 | Grant et al. |
| 2010/0309142 A1 | 12/2010 | Cruz-Hernandez et al. |
| 2011/0260988 A1 | 10/2011 | Colgate et al. |
| 2011/0261021 A1 | 10/2011 | Modarres et al. |
| 2012/0133494 A1 | 5/2012 | Cruz-Hernandez et al. |
| 2012/0286847 A1 | 11/2012 | Peshkin et al. |
| 2014/0139327 A1 | 5/2014 | Bau et al. |
| 2014/0191973 A1 | 7/2014 | Zellers et al. |
| 2014/0267076 A1 | 9/2014 | Birnbaum et al. |
| 2014/0320393 A1* | 10/2014 | Modarres ................ G06F 3/017 345/156 |
| 2014/0347323 A1 | 11/2014 | Colgate et al. |
| 2014/0375580 A1 | 12/2014 | Peshkin et al. |
| 2015/0061703 A1 | 3/2015 | Jiang et al. |
| 2016/0004309 A1 | 1/2016 | Modarres et al. |
| 2016/0231813 A1 | 8/2016 | Xu |

FOREIGN PATENT DOCUMENTS

| | | |
|---|---|---|
| EP | 2796964 A1 | 10/2014 |
| EP | 2821912 A1 | 1/2015 |

OTHER PUBLICATIONS

Strategic Polymer Sciences, Inc., "Revolutionary Electro Mechanical Polymer Actuators," Retrieved from http://www.strategicpolymers.com/technology/ on Apr. 11, 2013, 2 pages.

European Patent Office, "Extended European Search Report for EP Application No. 17190135.8", dated Mar. 8, 2018, 11 pages.

* cited by examiner

COMPENSATED HAPTIC RENDERING FOR FLEXIBLE ELECTRONIC DEVICES

TECHNICAL FIELD

This patent document relates to haptic effects and, more particularly, to compensated haptic rendering for flexible electronic devices.

BACKGROUND

The design of electronic devices continues to evolve including designs that enable the device to flex or bend in response to an applied force. A user's touch or grip on an electronic device will vary in accordance with the flexing and bending of the device as will various device parameters that are affected by the forces exerted by user's contact or the deformation. As such, the delivery of a desired haptic effect through the device to the user can be disrupted or altered by one or both of device contact and device deformation resulting in an unsatisfactory, or even undetectable, haptic sensation.

SUMMARY

This patent document relates to compensated haptic rendering for flexible electronic devices.

In one aspect, this patent document is directed to a device comprising a housing, a sensor, a controller and an actuator. The sensor is configured to detect a contact force exerted on the housing. The controller is communicatively coupled to the sensor and is configured to determine a change in a haptic effect caused by the contact force. The controller is additionally configured to generate an output instruction to deliver the haptic effect in a compensated form that is operable to correct the change. The actuator is configured to receive the output instruction and deliver the compensated haptic effect at the housing.

In another aspect, this patent document is directed to a device comprising a housing, a first sensor, a second sensor, a controller and an actuator. The first sensor is configured to detect a contact force exerted on the housing. The second sensor is configured to detect a deformation force created by deformation of the housing. The controller is communicatively coupled to the first and second sensors, and is configured to determine a change in a haptic effect caused by both the contact force and the deformation force. The controller is additionally configured to generate an output instruction to deliver the haptic effect in a compensated form that is operable to correct the change. The actuator is configured to receive the output instruction and deliver the compensated haptic effect at the housing.

In still another aspect, this patent document is directed to a method for compensating haptic effects including: (a) detecting a contact force exerted on a housing; (b) determining a change in a haptic effect to be delivered at the housing caused by the contact force; (c) determining a compensation for the haptic effect, the compensation operable to correct the change; (d) applying the compensation to the haptic effect; and (e) delivering the compensated haptic effect at the housing.

DETAILED DESCRIPTION

Figure 1:
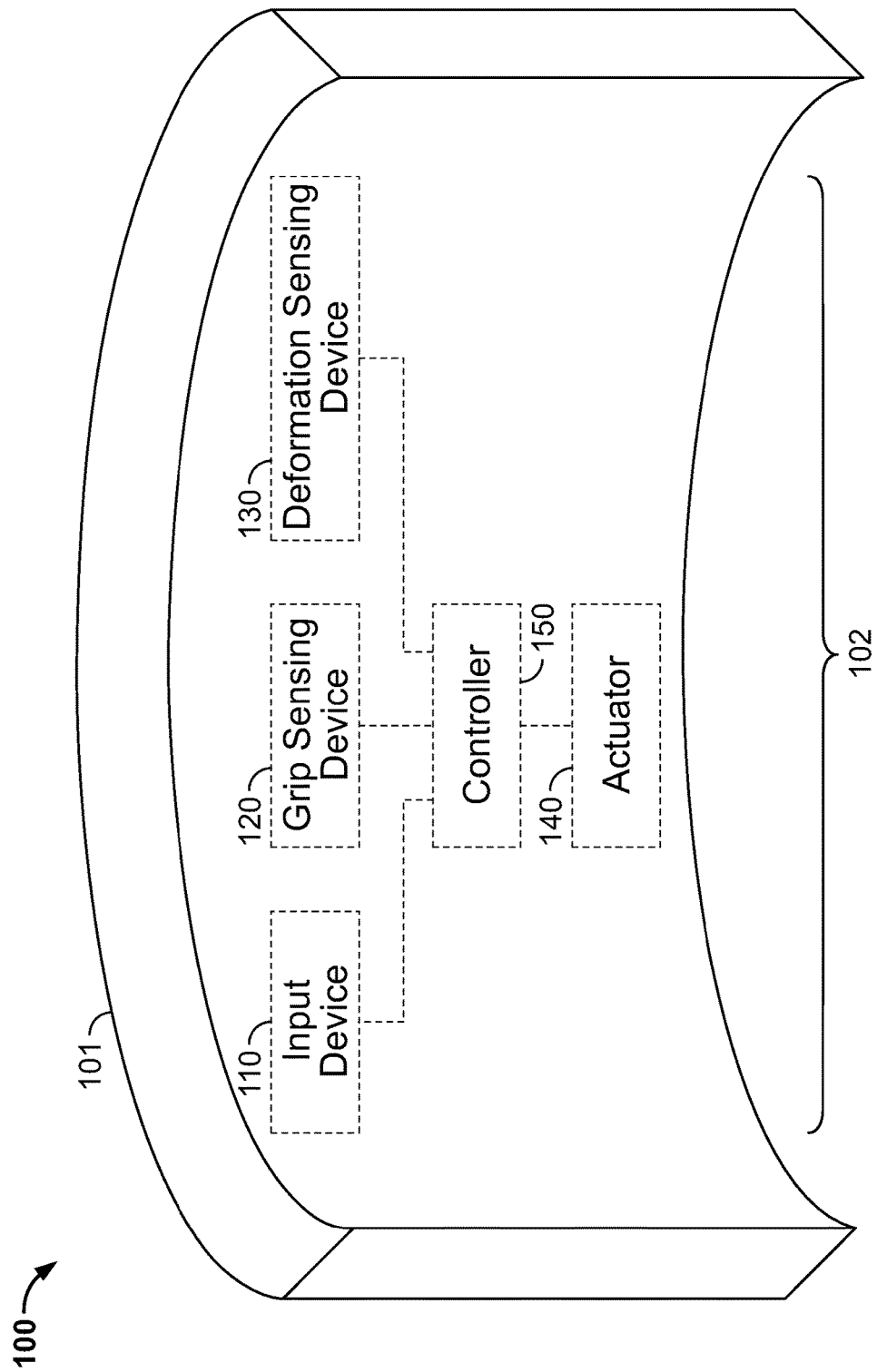
FIG. 1 is a schematic of flexible electronic device configured to deliver haptic effects according to various embodiments disclosed herein.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," "including," "has," and "having" are interchangeable and not intended to be limiting. The term "such as" also is not intended to be limiting. For example, the term "including" shall mean "including, but not limited to."

In general terms, this patent document relates to compensated haptic rendering for flexible electronic devices.

Referring to FIG. 1, a flexible electronic device 100 presents a housing 101 that includes a haptic effect system 102 that has an input device 110, a contact sensing device 120, a deformation sensing device 130, an actuator 140 and a controller 150. As used herein, the term "flexible electronic device" is any electronic device capable of changing shape from its original shape by flexing, bending, expanding, contracting, stretching, or otherwise yielding to an external force resulting in an alteration of original shape. Examples of flexible electronic devices include computers, tablets, smartphones, e-readers, keyboards, trackpads, medical devices, pens/stylus, remote controls, gaming controllers, joysticks, steering wheels, gear shifters, home appliances.

The input device 110 is any device that inputs a signal into the controller 150. An example of an input device 110 is a control device such as a switch. Another example of the input device 110 includes a transducer that inputs a signal to the controller 150. Examples of transducers that can be used as input device 110 include antennas and sensors. Various embodiments can include a single input device or two or more input devices of the same or different type. Further, while FIG. 1 shows the input device 110 as internal to the flexible electronic device 100, in various other embodiments the input device 110 may be external to the flexible electronic device 100.

The contact sensing device 120 can be any device that senses or otherwise detects a force exerted by a user on the flexible electronic device 100 through either direct or indirect contact with the device 100. The contact sensing device 120 provides notification of that detection as an input to the controller 150. Examples of contact forces exerted by the user on the flexible electronic device 100 include forces exerted through direct contact with the device (e.g., a user's single-handed or dual-handed grip on the device, a single finger touch of the device, a multi-finger touch of the device, or touching the device with other user body parts). Examples of contact forces exerted by the user on the flexible electronic device 100 further include forces exerted through indirect contact with the device such as forces transferred from a user through an interfacing medium to the device (e.g., the flexing of a user's wrist transfers a force through a watch band to the watch housing mounted on the band; the watch housing is experiencing indirect user contact). Examples of sensors that can be used as the contact sensing device 120 include pressure sensors, vibration sensors and other sensors described herein. Various embodiments can include a single contact sensing device 120 or a plurality of contact sensing devices 120 that may be presented individually or in an array configuration; the plurality of contact sensing devices 120 can be spread equidistantly about the flexible electronic device 100 or can be spread non-equidistantly about the device 100.

The deformation sensing device 130 can be any device that senses or otherwise detects a force caused by the deformation, e.g., flexing, bending, and twisting, of the flexible electronic device 100 itself and provides notification of that detection as an input to the controller 150. Various types of sensors may be used as the deformation sensing device 130 including pressure sensors, vibration sensors and other sensors described herein. Various embodiments can include a single deformation sensing device 130 or a plurality of deformation sensing devices 130 that may be presented individually or in an array configuration; the plurality of deformation sensing devices 130 can be spread equidistantly about the flexible electronic device 100 or can be spread non-equidistantly about the device 100. In various example embodiments, a contact sensing device 120 or, alternatively, a deformation sensing device 130 may perform both functions of contact sensing and deformation sensing. Further, in some example embodiments, the deformation sensing device 130 is eliminated and only the contact sensing device 120 is used to provide data to the controller 150 while in other example embodiments the contact sensing device 120 is eliminated and only the deformation sensing device 130 is used to provide data to the controller 150.

The actuator 140 can be any controlled mechanism or other structure that initiates movement for deliverance of a haptic effect. The haptic effect can be any type of tactile sensation delivered from the flexible electronic device 100 to the user. Examples of actuators 140 include mechanisms such as motors, linear actuators (e.g. solenoids), magnetic or electromagnetic mechanisms. Additional examples of actuators 140 include smart materials such as shape memory alloys, piezoelectric materials, electroactive polymers, and materials containing smart fluids. The actuator 140 can comprise a single actuator or a plurality of actuators provided within the flexible electronic device 100. In the instance of a plurality of actuators 140, the actuators can be provided in an actuator array, or individually positioned, with the actuators 140 equidistantly spaced or non-equidistantly spaced. The haptic effect can, for example, be delivered as a vibrotactile haptic effect, an electrostatic friction (ESF) haptic effect, or a deformation haptic effect.

The controller 150 is any type of circuit that controls operation of the actuator 140 based on receiving a signal or data from the input device 110, the contact sensing device 120, and the deformation sensing device 130. Data can be any type of parameters (e.g., conditions, events, contact-related parameters, and deformation-related parameters), instructions, flags, or other information that is processed by the processors, program modules and other hardware disclosed herein.

In operation, the input device 110, the contact sensing device 120, and the deformation sensing device 130 are stimulated, and each provides an input signal to the controller 150. In response, the controller 150 operates the actuator 140 to deliver a haptic effect to the user via the flexible electronic device 100. The delivered haptic effect is configured to compensate for user contact forces or deformation forces on the device 100. The haptic effect can be any type of tactile sensation delivered directly or indirectly to a user. The haptic effect embodies a message such as a cue, notification, or more complex information.

Figure 2:
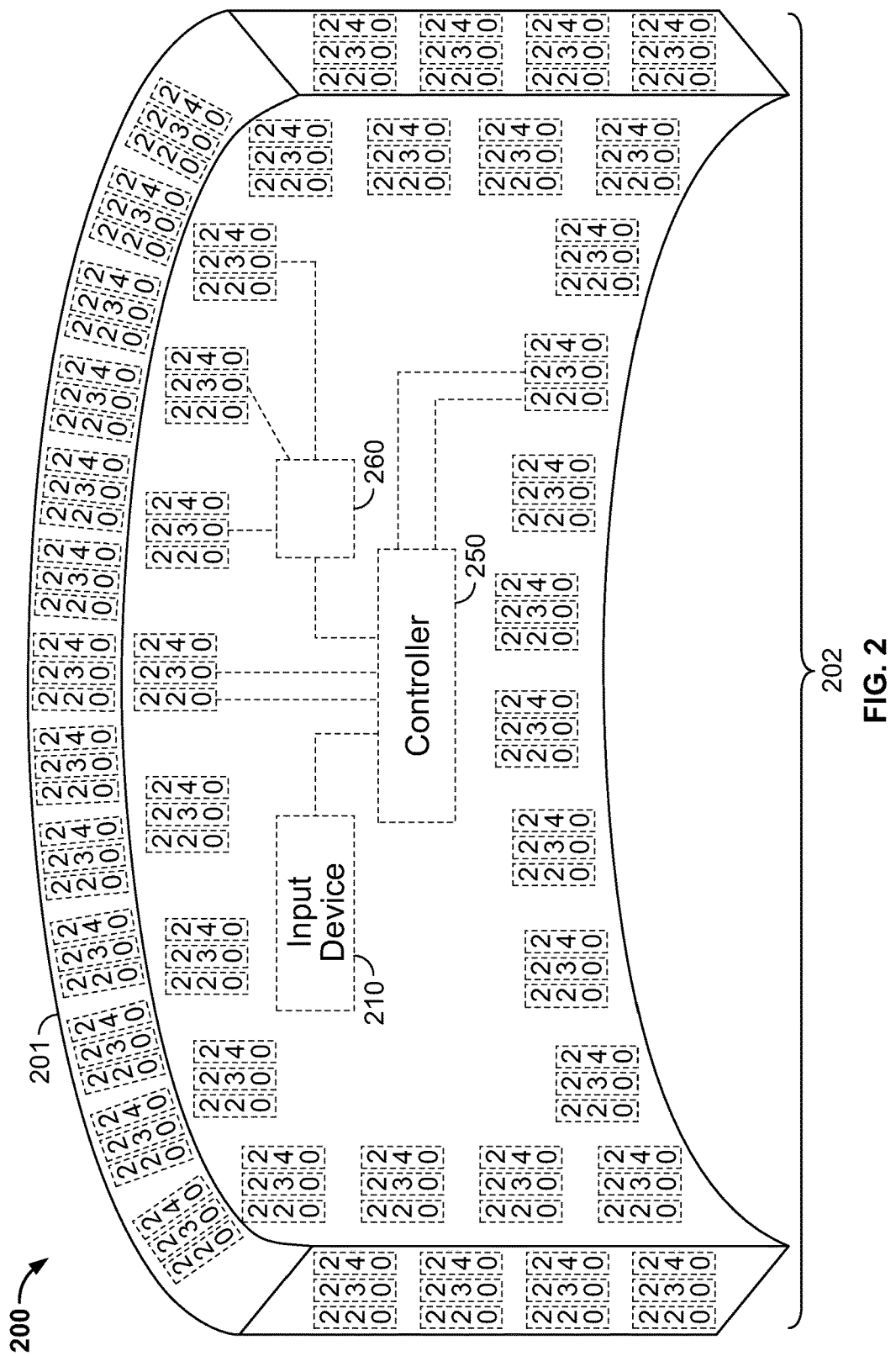
FIG. 2 is a schematic of another possible embodiment of the flexible electronic device.

FIG. 2 illustrates a more detailed schematic of a possible embodiment of a flexible electronic device 200 having a housing 201 and haptic effect system 202. In this embodiment, the haptic effect system 202 of the flexible electronic device 200 includes an input sensor 210, a plurality of contact sensors 220, a plurality of deformation sensors 230, a plurality of actuators 240 and a controller 250. The contact sensors 220, the deformation sensors 230, and the actuators 240 are positioned throughout the device 200. The input sensor 210, the contact sensors 220, and the deformation sensors 230 are in electrical communication with the controller 250. One or more actuator drive circuits 260 are in electrical communication with the controller 250 and with one or more actuators 240. Note that only a few exemplary connections between components have been provided to simplify the diagram; other connections between components are to be considered as included in the schematic.

The input sensor 210 can be any instrument or other device that outputs a signal in response to receiving a stimulus; the input sensors can be used to detect or sense a variety of different conditions or events. The input sensor 210 can be hardwired to the controller 250 or can be connected to the controller wirelessly. Further, the input sensor 210 can comprise a single sensor or a plurality of sensors that are included within, or external to, the flexible electronic device 200.

The contact sensors 220 can be any instrument or other device that outputs a signal in response to sensing or detecting a contact force exerted by direct or indirect contact of the user with the flexible electronic device 200; the contact sensors 220 can be used to detect or sense a variety of contact-related parameters. The contact sensors 220 can be hardwired to the controller 250 or can be connected to the controller 250 wirelessly. In various example embodiments, the contact sensors 220 comprise a plurality of touch sensors (e.g., capacitive sensors or force-sensitive resistors) that lie behind substantially all of the surfaces of the flexible electronic device 200. The surfaces of the flexible electronic device 200 can include, for example, the surfaces of a device housing, the surfaces of a device touchscreen, the surfaces of a device display screen and the surfaces of a device button or switch.

The deformation sensors 230 can be any instrument or other device that outputs a signal in response to sensing a force caused by a deformation, e.g., flexing, bending, and twisting, of the housing 201 of flexible electronic device 200; the deformation sensors 230 can be used to detect or sense a variety of deformation-related parameters. The deformation sensors 230 can be hardwired to the controller 250 or can be connected to the controller 250 wirelessly. In various example embodiments, the deformation sensors 230 comprise strain gauges, force-sensitive resistors or piezoelectric sensors that lie behind substantially all of the surfaces of the flexible electronic device 200. In various example embodiments, a sensor may perform both the functions of contact force sensing and deformation force sensing. Further, in some example embodiments, the deformation sensors 230 are eliminated and only the contact sensors 220 are used to provide data to the controller 250 while in other embodiments the contact sensors 220 are eliminated and only the deformation sensors 230 are used to provide data to the controller.

Various other examples of input sensors 210, contact sensors 220, and deformation sensors 230 include acoustical or sound sensors such as microphones; vibration sensors; chemical and particle sensors such as breathalyzers, carbon monoxide and carbon dioxide sensors, and Geiger counters; electrical and magnetic sensors such as voltage detectors or hall-effect sensors; flow sensors; navigational sensors or instruments such as GPS receivers, altimeters, gyroscopes, or accelerometers; position, proximity, and movement-related sensors such as piezoelectric materials, rangefinders, odometers, speedometers, shock detectors; imaging and other optical sensors such as charge-coupled devices (CCD), CMOS sensors, infrared sensors, and photodetectors; pressure sensors such as barometers, piezometers, and tactile sensors; force sensors such as piezoelectric sensors and strain gauges; temperature and heat sensors such as thermometers, calorimeters, thermistors, thermocouples, and pyrometers; proximity and presence sensors such as motion detectors, triangulation sensors, radars, photo cells, sonars, and hall-effect sensors; biochips; biometric sensors such as blood pressure sensors, pulse/ox sensors, blood glucose sensors, and heart monitors. Additionally, the sensors can be formed with smart materials, such as piezo-electric polymers, which in some embodiments function as both a sensor and an actuator.

The controller 250 is any type of circuit that controls operation of the actuators 240 based on receiving a signal or data from the input sensor 210, the contact sensors 220, and the deformation sensors 230. Data can be any type of parameters (e.g., conditions, events, contact-related parameters, and deformation-related parameters), instructions, flags, or other information that is processed by the processors, program modules and other hardware disclosed herein.

The one or more actuator drive circuits 260 are circuits that receive a haptic signal from the controller 250. The haptic signal embodies haptic data, and the haptic, data defines parameters that the actuator drive circuit 260 uses to generate a haptic drive signal. Examples of parameters that can be defined by the haptic data include frequency, amplitude, phase, inversion, duration, waveform, attack time, rise time, fade time, and lag or lead time relative to an event. The haptic drive signal is applied to the actuators 240 causing motion within the actuators 240.

In operation, the input sensor 210 detects an event or condition, the contact sensors 220 detect forces exerted via direct or indirect user contact with the housing 201, and the deformation sensors 230 detect forces exerted by the actual deformation of the housing 201. In response to the detected event or condition, the controller 250 determines: (a) the appropriate haptic effect to deliver; and (b) the change in the haptic effect caused by the contact forces and by the deformation forces. The controller 250 then operates to modify the haptic effect to correct, or compensate, for the contact forces and deformation forces on the haptic effect. The controller 250 then provides the instruction for delivering the compensated haptic effect to the one or more drive circuits 260 to initiate the desired actuation of the actuators 240. Due to the compensation, the haptic effect delivered to the user feels to the user as though the contact forces or the deformation forces on the device have had substantially no effect on the delivered haptic effect.

Figure 3:
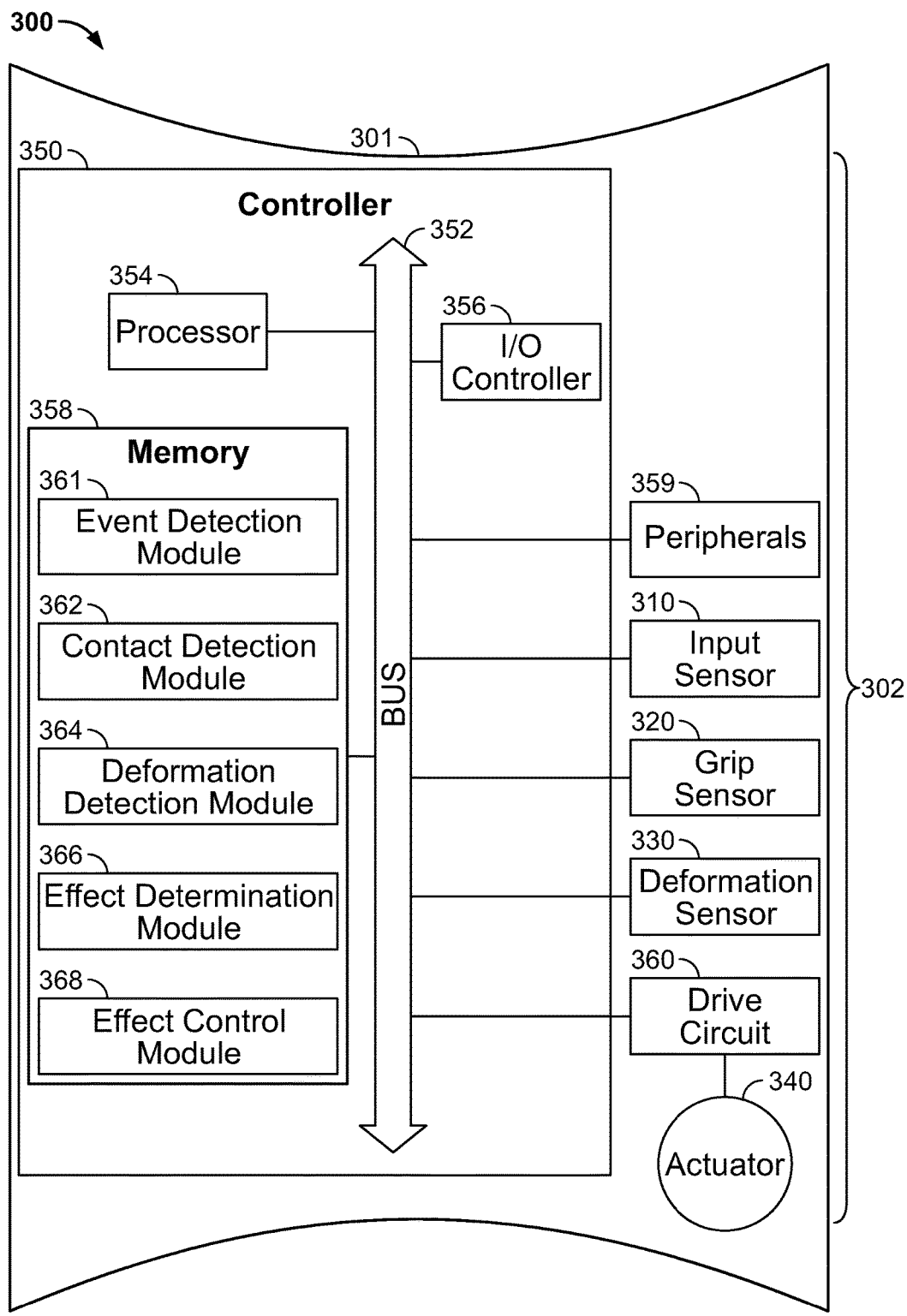
FIG. 3 is a schematic of another possible embodiment of the flexible electronic device.

FIG. 3 illustrates a more detailed schematic of a possible embodiment of a flexible electronic device 300 with a housing that includes a haptic effect system 302. In this embodiment, the haptic effect system 302 of the flexible electronic device 300 includes an input sensor 310, a contact sensor 320, a deformation sensor 330, an actuator 340 and a controller 350. The input sensor 310, the contact sensor 320, and the deformation sensor 330 are in electrical communication with the controller 350. An actuator drive circuit 360 is in electrical communication with the controller 350 and the actuator 340.

The input sensor 310, contact sensor 320, deformation sensor 330, and actuator 340, correspond to input sensors 210, contact sensors 220, deformation sensors 230, and actuators 240, respectively, as described herein.

The controller 350 generally includes a bus 352, a processor 354, an input/output (I/O) controller 356 and a memory 358. The bus 352 couples the various components of the controller 350, including the I/O controller 356 and memory 358, to the processor 354. The bus 352 typically comprises a control bus, address bus, and data bus. However, the bus 352 can be any bus or combination of buses suitable to transfer data between components in the controller 350.

The processor 354 can comprise any circuit configured to process information and can include a suitable analog or digital circuit. The processor 354 can also include a programmable circuit that executes instructions. Examples of programmable circuits include microprocessors, microcontrollers, application specific integrated circuits (ASICs), programmable gate arrays (PGAs), field programmable gate arrays (FPGAs), or any other processor or hardware suitable for executing instructions. In the various embodiments the processor 354 can comprise a single unit, or a combination of two or more units, with the units physically located in a single controller 350 or in separate devices.

The I/O controller 356 comprises circuitry that monitors the operation of the controller 350, and peripheral or external devices such as the input sensor 310, the force exertion sensor 320, the deformation sensor 330, and the actuator drive circuit 360. The I/O controller 356 further manages data flow between the controller 350 and the peripheral devices, and frees the processor 354 from details associated with monitoring and controlling the peripheral devices. Examples of other peripheral or external devices 359 with which the I/O controller 356 can interface include external storage devices, monitors, input devices such as keyboards, mice or pushbuttons, external computing devices, mobile devices, and transmitters/receivers.

The memory 358 can comprise volatile memory such as random access memory (RAM), read only memory (ROM), electrically erasable programmable read only memory (EERPOM), flash memory, magnetic memory, optical memory or any other suitable memory technology. The memory 358 can also comprise a combination of volatile and nonvolatile memory.

The memory 358 is configured to store a number of program modules for execution by the processor 354, including an event detection module 361, a contact detection module 362, a deformation detection module 364, an effect determination module 366, and an effect control module 368. Each program module is a collection of data, routines, objects, calls and other instructions that perform one or more particular task. Although certain program modules are disclosed herein, the various instructions and tasks described for each module can, in various embodiments, be performed by a single program module, a different combination of modules, modules other than those disclosed herein, or modules executed by remote devices that are in communication with the controller 30.

The event detection module 361 is programmed to receive event data from the input sensor 310 and evaluate the received event data to determine if the event data is associated with a haptic effect. In the instance that the input sensor 310 is internal to the flexible electronic device 300, the event data from input sensor 310 can comprise data generated by an event occurring at or in the device 300. Alternatively, in the instance that the input sensor 310 is external to the flexible electronic device 300, the event data from input sensor 310 can comprise data generated by a device or system that is separate from the flexible electronic device 300. An event can, for example comprise, an individual input (e.g., a button press, the manipulation of a joystick, user interaction with a touch sensitive surface, or any other interaction with a user interface). In another example, the event can comprise a system status (e.g., low battery, low memory, and an incoming call), a sending of data, a receiving of data, or a program event (e.g., a game program producing the explosions, gunshots, collisions, interactions between characters, bumpy terrains).

The contact detection module 362 is programmed to receive contact data from the contact sensor 320 within the flexible electronic device 300 and evaluate that data to establish parameters related to the direct or indirect contact of the by device 300 by the user. Examples of contact-related parameters include the location, area and applied pressure at the contact points between the user and the device 300. Further examples of contact-related parameters include, for example, the number of fingers being used to grip or touch the device 300; the position of the user's grip or touch (direct or indirect) on the device 300 regardless of, or in relation to, the orientation of the device 300, the pressure being exerted by the user's grip or touch (direct or indirect) on the device 300; the heat being transferred from the user's grip or touch (direct or indirect) to the device 300; the temperature change caused by the user's grip or touch (direct or indirect) on the device 300; the electrical conductivity of the user's grip or touch (direct or indirect) on the device 300; the vibration of the user's grip or touch (direct or indirect) on the device 300; or the deformation of a surface of the device 300 caused by the user's grip or touch (direct or indirect) on the device 300.

The contact data may be obtained on a sensor-by-sensor basis or may be representative of a plurality contact sensors 320. For example, a plurality of contact sensors 320 can be defined as identifying a region of the surface of the flexible electronic device 300 to provide contact data on a region-by-region basis. In other examples, the contact data can be obtained from a plurality of contact sensors 320 where the contact data is obtained on a finger-by-finger basis. In various example embodiments, the contact detection module 362 can use the contact data to infer the posture of a user's hand, for example, based on a model of the mechanical constraints of the hand and the relative area of different finger pads. The contact detection module 362 can determine, for example, based on the contact data, whether the flexible device 300 is held in one or two hands, whether the device 300 is being touched by the thumb or other fingers, or whether the device 300 is being directly or indirectly touched by the user.

The deformation detection module 364 is programmed to receive deformation data from the deformation sensor 330 within the flexible electronic device 300 and evaluate the deformation data to determine parameters relating to the deformation of the device. Examples of deformation-related parameters include the amount or angle of flex/bend of the device 300, the pressure created by the flex/bend of the device 300, or the change in temperature caused by the flex/bend of the device 300.

Upon the event detection module 361 determining that event data is associated with a haptic effect, the effect determination module 366 selects a haptic effect to deliver through the actuator 340. An example technique that the effect determination module 366 can use to select a haptic effect includes rules programmed to make decisions on the selection of a haptic effect. Another example technique that can be used by the effect determination module 366 to select a haptic effect includes lookup tables or databases that relate the haptic effect to the event data.

The effect determination module 366 additionally determines how the contact data and the deformation data will affect the delivery of the selected haptic effect. In various embodiments, for example, the effect determination module 366 is programmed to realize that the contact-related parameters or deformation-related parameters will affect the amplitude and frequency of the delivered haptic effect by changing vibration transmission properties of the actuators 340 and vibration transmission properties of the flexible electronic device 300 itself.

Accordingly, in various example embodiments, the effect determination module 366 is programmed to map the contact data or deformation data (e.g., grip or touch force, grip or touch location, deformation, etc.) to a model of vibration transmissions to ascertain the effects of the data. In various example embodiments, the vibration transmission model is in the form of a transfer function indicating how different frequencies of vibrations of the actuator 340 are attenuated or amplified by the contact with or deformation of the housing 301. In various example embodiments, this model of vibration transmission additionally takes into account the starting point of haptic effect vibrations (e.g., the location at which actuator 340 the delivery of the haptic effect will begin) as well as the location of the contact sensor 320 (e.g., location of contact or touch input). In the instance of a multi-actuator 340 configuration, a model of vibration transmission can be developed for each actuator 340 or grouping of actuators 340 to ascertain the effects of the contact or deformation on the selected haptic effect. In various example embodiments, other manners of ascertaining the effects of the user contact or deformation on the selected haptic effect are used, for example, by using alternative system models or look-up tables.

Upon the effect determination module 366 selecting a haptic effect for delivery and ascertaining the effect of user contact and deformation on the selected haptic effect, the effect control module 368 operates to determine how to modify the selected haptic effect to correct, or compensate, for the effects of that contact or deformation such that the haptic effect that is ultimately delivered to the user feels unaffected by contact or deformation. In the case of a single actuator, for example, the vibration transmission model, described herein, can be inverted and used as filter on the haptic signal. To further explain, if the contact with the device 300 or the deformation force of the device 300 operates to attenuate the vibrations of the actuator 340 at 50 Hz, for example, the effect control module 368 can amplify the actuator 340 at the same frequency of 50 Hz to correct for the attenuation and produce a compensated haptic effect for rendering to the user.

Additionally, or alternatively, in various example embodiments, the effect control module 368 can include one or more smart algorithms to analyze the vibration transmission model, described herein, and apply corrective measures. For example, if vibrations of 50 Hz are known to be attenuated, the effect control module 368 can correct the attenuation by changing actuator operation to 100 Hz resulting in improved transmission of vibrations. As such, correction can comprise one-to-one off-set compensation or other manners of dealing with contact or deformation effects by, for example, changing the frequency of operation of the actuator 340. Any correction that results in the rendering of a haptic effect for which the effects of contact or deformation are substantially unnoticed can be used as and deemed a form of compensation.

Upon the effect control module 368 determining appropriate compensation to the selected haptic effect, the controller 350 generates a haptic instruction signal to direct activation of the one or more actuators 340 to deliver the compensated haptic effect, via the actuator drive circuit 360, through the device 300. The actuator drive circuit 360 generates a corresponding actuator drive signal that is delivered to the actuator 340 initiating actuator operation. The result is the delivery of a compensated haptic effect to the user that feels to the user as though the current contact with or deformation of the device 300 has had no effect on the haptic rendering.

Figure 4:
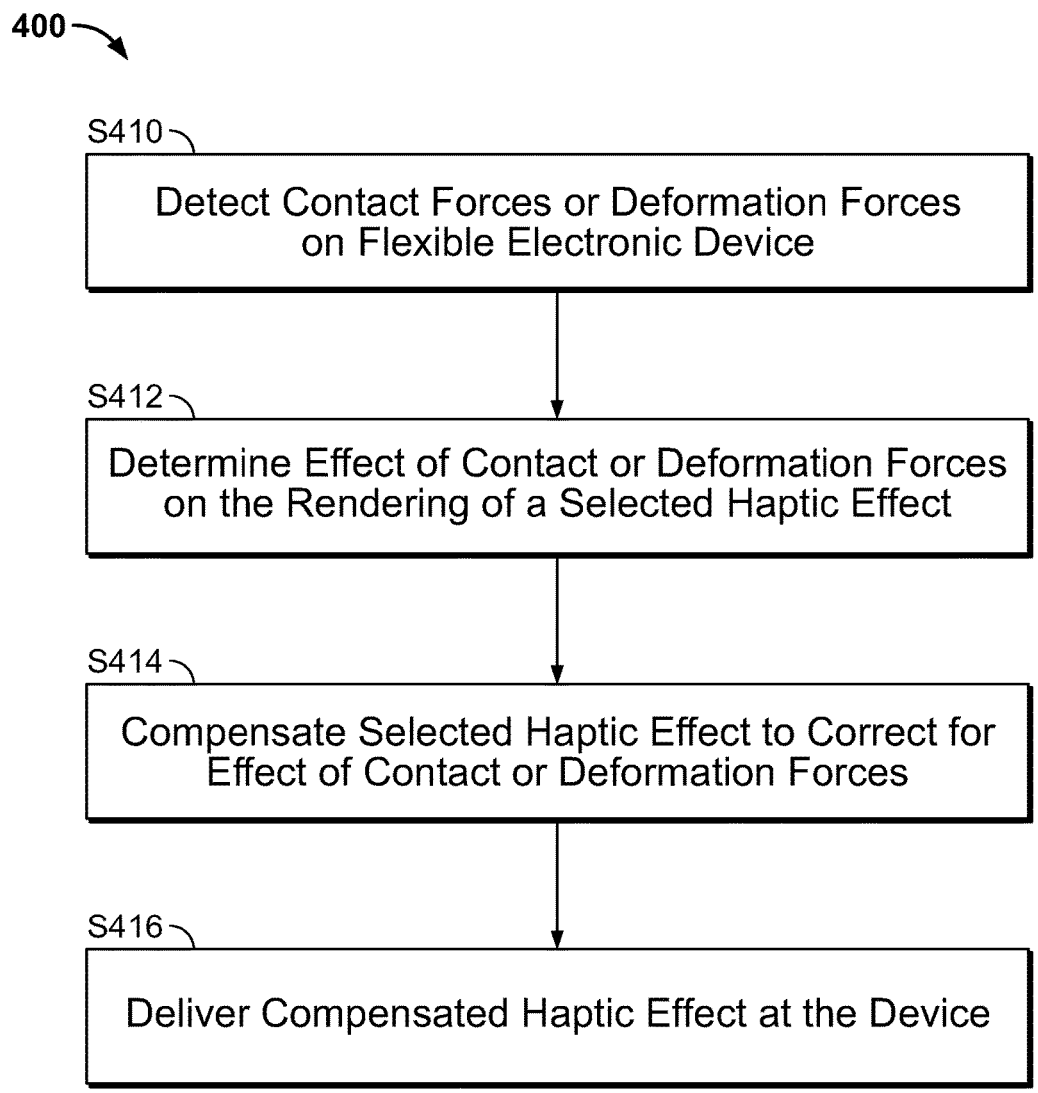
FIG. 4 is a flowchart illustrating a method for compensating a haptic effect.

FIG. 4 provides a flowchart illustrating a simplified method 400 for compensated haptic effect rendering in a flexible electronic device that incorporates a haptic effect system. The method 400 can be utilized with any of the various embodiments or combinations of embodiments described above. In the method 400, the contact with or the deformation of the electronic device are detected, S410. Then the effect of the contact or deformation on a selected haptic effect is ascertained, S412. The selected haptic effect is then compensated to correct for the effect(s), S414. And, subsequently, the compensated haptic effect is delivered at the device, S416. The steps of the method 400 can be performed in any appropriate order to achieve the final result of the delivery of the desired haptic effect.

Figure 5:
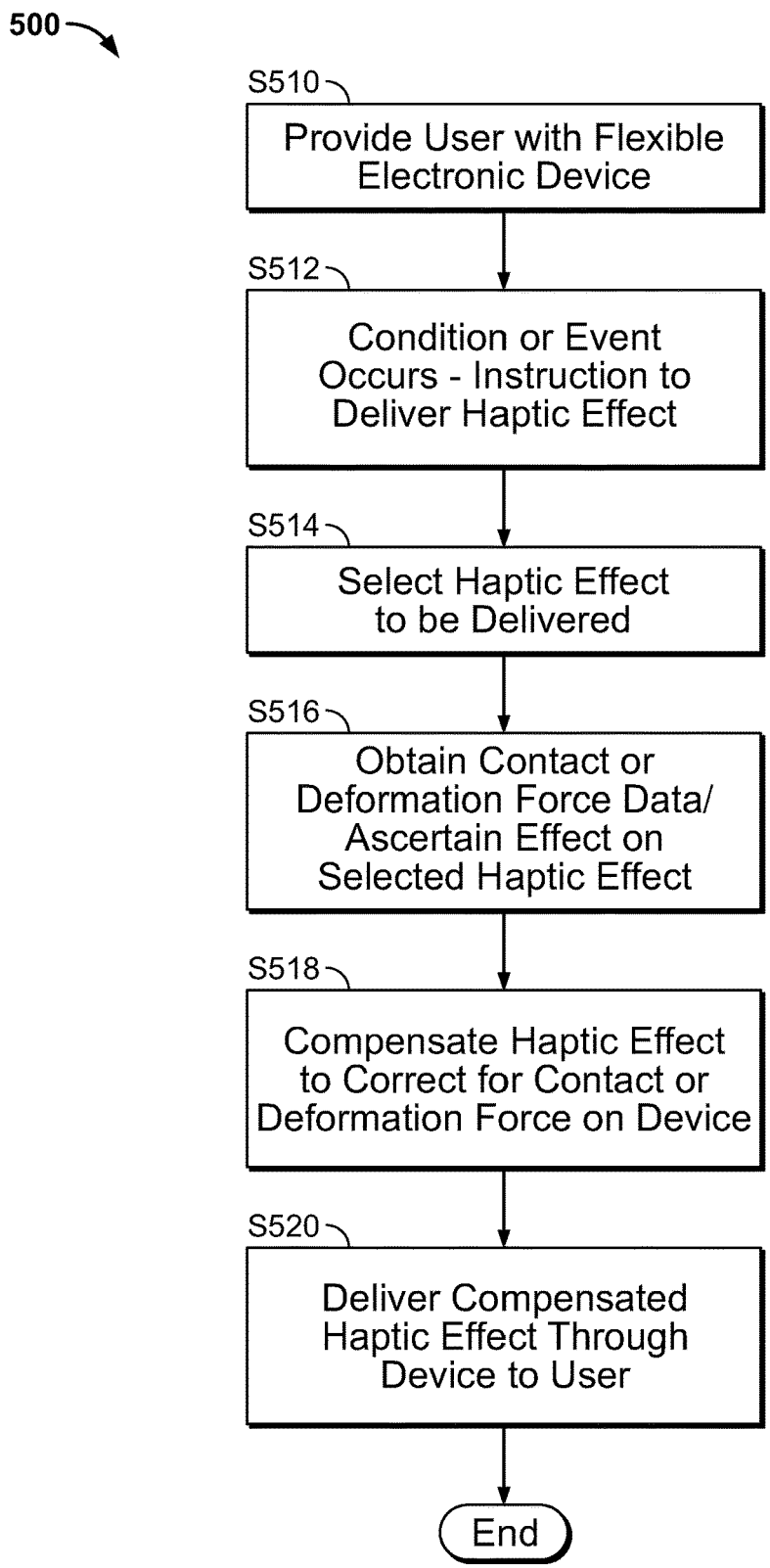
FIG. 5 is a flow chart illustrating a method for compensating a haptic effect.

FIG. 5 provides a more detailed flowchart illustrating a method 500 for compensated haptic effect rendering in a flexible electronic device. The method 500 can be utilized with any of the various embodiments or combinations of embodiments described above. In the method 500, the user is provided with a flexible electronic device, S510; the device may already incorporate a deformation from its original shape or the user may deform the device from its original shape by flexing, bending or otherwise deforming the device. The flexible device is instructed to deliver a haptic effect based on the occurrence of a condition or an event, S512. Next, based on the condition or event, a haptic effect is selected for delivery, S514. Subsequently, contact-related data or deformation-related data of the device is determined, and the effect of the contact or deformation on the selected haptic effect is determined based on the data, S516. The selected haptic effect is then compensated to correct for the contact with or deformation of the device, S518. Finally the compensated haptic effect is delivered to the user via the device, S520. The compensated haptic effect is rendered to the user such that any change in delivery of the haptic effect that would have been caused by the contact with or deformation of the device is now substantially undetectable by the user. The steps of the method 500 can be performed in any appropriate order to achieve the final result of the delivery of the desired haptic effect.

The various embodiments of flexible electronic devices having haptic effect systems as described herein include the ability to detect user contact with or deformation of the device. Further, the various embodiments include the ability determine the impact of that contact or deformation on the rendering of a haptic effect and the ability to modify the rendering of that haptic effect to compensate for the contact or deformation. The various embodiments described herein have numerous applications. Consider an example application where a user bends their flexible phone to control the volume on a television. As the user bends the phone, the user feels distinct detents as the volume increases. Every detent feels the same to the user. The user is not aware of the correction but the controller within the flexible phone is actually adjusting the intensity of vibrations as the user bends the phone such that the vibration pulses delivered through the flexible phone feel the same to the user despite changes in the stiffness of the phone caused by the flexing.

Consider another example application wherein a user changes their grip on a flexible tablet to enable accomplishment of a task. As the user types on the tablet, the user holds the back of the tablet with one hand and types with the other. As the user plays a game, however, the user holds the tablet with two hands so that the user can more easily bend the tablet. The haptic feedback provided through the tablet feels consistent; the user does not notice that different actuators are activated with different intensities to correct or compensate for how the user holds the tablet.

Various examples of flexible electronic devices 600 in relation to user contact or deformation, e.g., a user's grip, are illustrated in FIGS. 6A-6E. Each of the figures illustrates a unique grip or deformation of the device 600 for which the haptic effect system (e.g., 102, 202, 302) of the device 600 operates to correct when delivering a haptic effect to the user. Of course, numerous other types of contact with or deformations of the device 600 for which the haptic effect system may correct are possible.

Figure 6A:
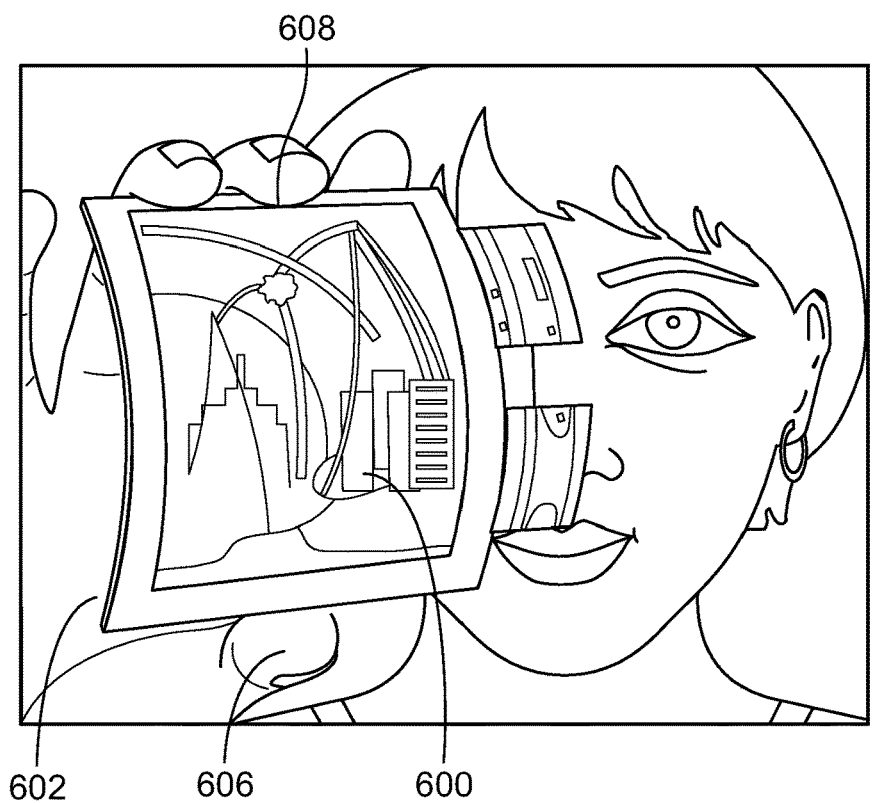
FIG. 6A-6E illustrate various grip configurations on a flexible electronic device.

The various grips illustrated in FIGS. 6A-6E include single-handed grips, e.g., using only a first hand 602 to support the device 600, and dual-handed grips, e.g., using both the first hand 602 and a second hand 604 to support the device 600. FIG. 6A illustrates an example of a single-handed grip, e.g., only the first hand 602 is used to hold the device 600. The thumb 606 of the hand 602 supports a lower edge of the device 600 while fingertips 608 of the hand 602 grasp the upper edge of the device 600. FIG. 6A also illustrates a deformation of the device 600 comprising an outward bowing of the device from the user's hand 602. The various embodiments of the haptic effect system disclosed herein are configured to haptically correct for the noted grip or deformation of the device 600 when delivering a haptic effect to the user.

Figure 6B:
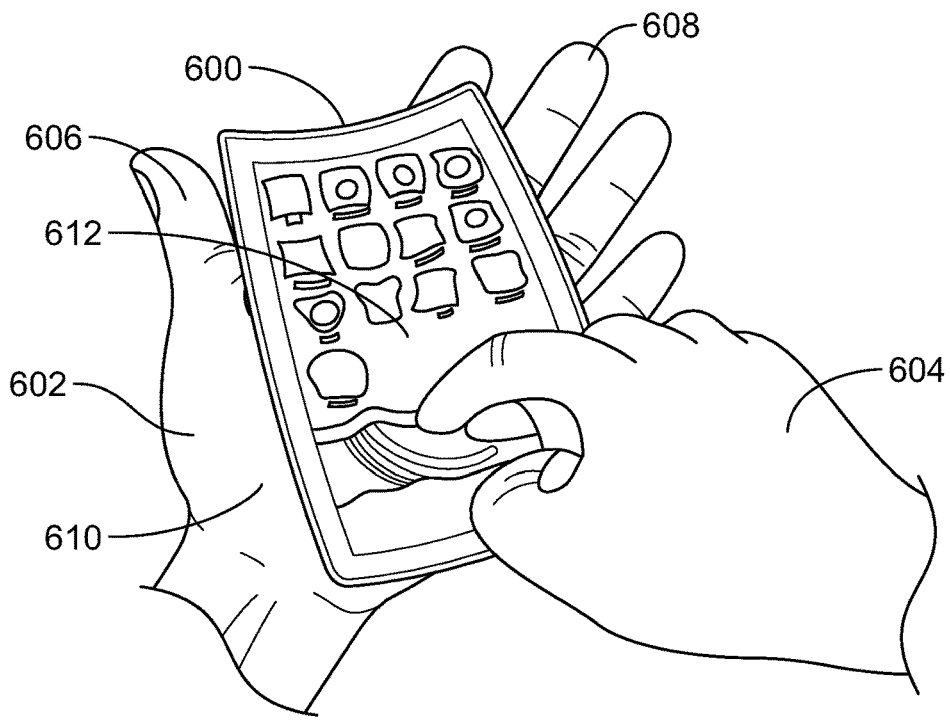

FIG. 6B illustrates another singled handed grip of a flexible electronic device 600. In this example, a back surface of the device 600 is supported in the palm 610 of the first hand 602 while the thumb 606 and the fingertips 608 support side edges of the device 600. The user's second hand 604 is used to interact with a user interface 612 of the device 600. FIG. 6B also illustrates a deformation of the device 600 with the device bowed inward to the user's hand 602. The various embodiments of the haptic effect system disclosed herein are configured to haptically correct for the noted grip or deformation of the device 600 when delivering a haptic effect to the user.

Figure 6C:
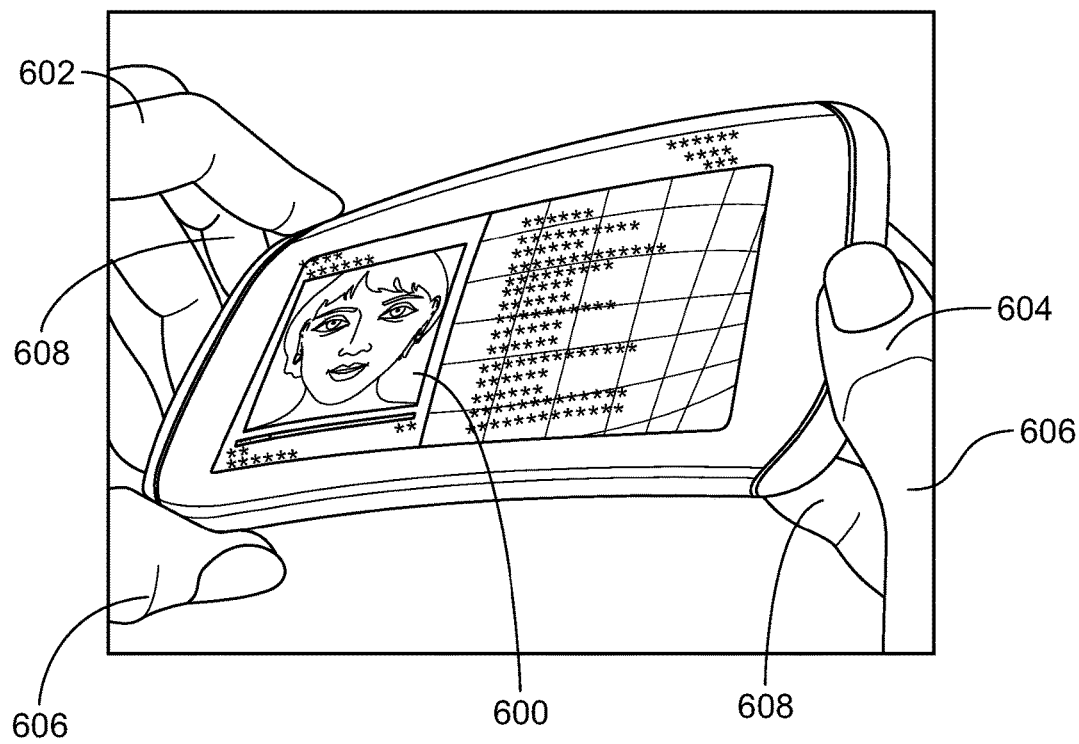

FIG. 6C illustrates an example of a dual-handed grip, where both the first hand 602 and the second hand 604 operate in conjunction to support and hold the device 600.

As shown the thumb 606 of the first hand is used to support a bottom edge of the device 600 while the fingertips 608 of the first hand grasp an upper and side edge of the device 600. Further, the fingertips 608 of the second hand 604 support a back surface of the device 600 while the thumb 606 of the second hand grasps a front edge of the device 600. FIG. 6C also illustrates a deformation of the device 600 in the form a twist as the upper rear corner of the device 600 is farther back from the plane defined by the lower front corner of the device. The various embodiments of the haptic effect system disclosed herein are configured to haptically correct for the noted grip or deformation of the device 600 when delivering a haptic effect to the user.

Figure 6D:
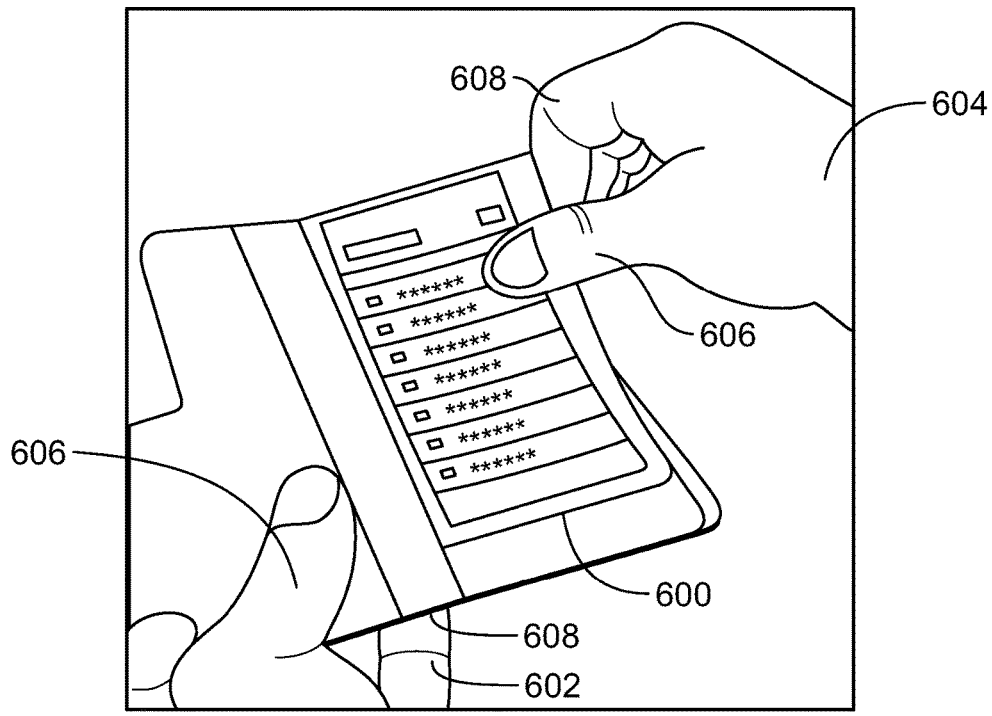

FIG. 6D illustrates an example of a dual-handed grip, where the first hand 602 supports the device 600 and the second hand 604 grasp and twists an upper corner of the device 600. As shown, the fingertips of the first hand 602 support a back surface of the device 600 while the thumb 606 of the first hand grasps a front surface of the device 600. The thumb 606 and the fingertips of the second hand 604 are used to grasp a front and back surface of the device, and to twist a corner of the device. The various embodiments of the haptic effect system disclosed herein are configured to haptically correct for the noted grip or deformation of the device 600 when delivering a haptic effect to the user.

Figure 6E:
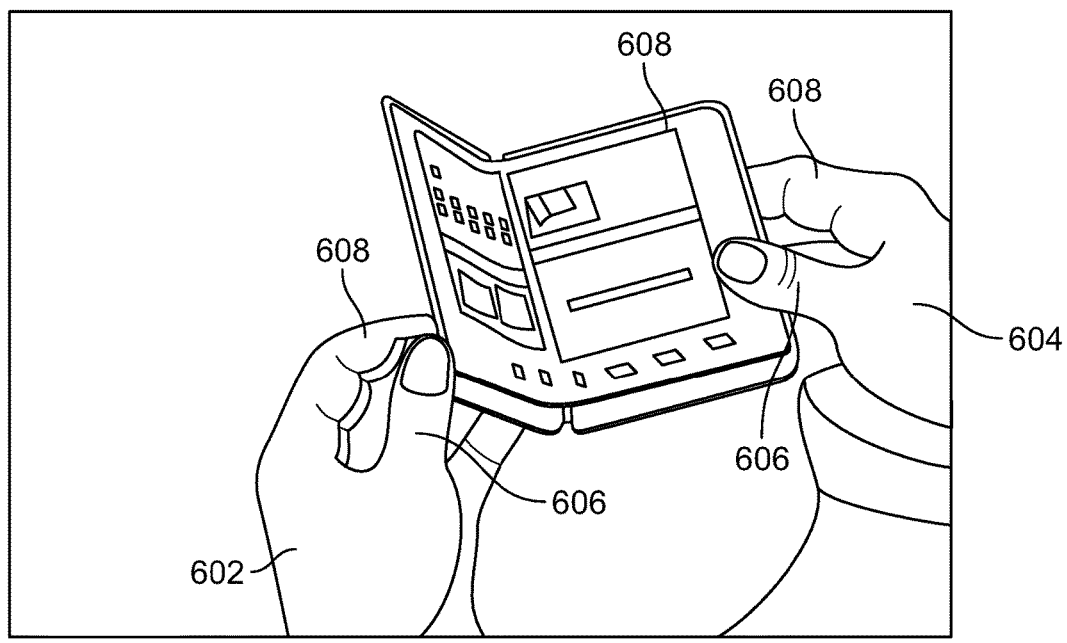

FIG. 6E illustrates an example of a dual-handed grip, where the first hand 602 supports a first half of the device 600 and the second hand 604 supports an unfolded second half of the device 600. As shown, the fingertips 608 of the first hand 602 support a surface of the unfolded second half of the device 600 while the thumb 606 of the first hand 602 grasps a side edge of the unfolded second half of the device 600. The fingertips 608 of the second hand 604 support a back surface of the first half of the device 600 while the thumb grasps a front surface of the first half of the device 600. FIG. 6E illustrates a deformation of the device 600 in the form of a centerfold with a portion of the device 600 unfolded. The various embodiments of the haptic effect system disclosed herein are configured to haptically correct for the noted grip or deformation of the device 600 when delivering a haptic effect to the user.

The various embodiments of the haptic effect system described herein can additionally, or alternatively, correct for natural haptic feedback in the delivery of a haptic effect through a flexible electronic device. Natural haptic feedback occurs when the flexible device produces force to oppose deformation. By way of example, a user bends a flexible electronic device to control scrolling in the device. As the user bends the device, the device itself opposes the bending. The opposition force produced by the flexible device depends on the amount of bending or flexing of the device as well as the properties of the flexible material, e.g. stiffness. This opposition force, or natural haptic feedback, produced by the flexible device is not programmable but rather is a consequence of the physical properties of the design.

Compensation of a selected haptic effect to correct for the natural haptic feedback of the device can be achieved by using one or more deformation sensors, such as those described herein, to detect the deformation of the device. The deformation sensor can then provide a signal representative of the deformation to the haptic effect system controller whereby the controller can utilize a model, e.g., vibration transmission model as described herein, or look-up table to determine the natural haptic feedback that the device is expected to produce. After, learning the expected natural haptic feedback and ascertaining its effect on the selected haptic effect, the controller can compensate the selected haptic effect. The compensation of the selected haptic effect corrects for the expected natural haptic feedback such that when the compensated haptic effect is delivered to the user, the user is substantially unaware of the effect of the natural haptic feedback forces on the flexible device and its haptic effect system.

For example, as a request for a specific force in the delivery of a haptic effect is received, the forces produced by the natural haptic feedback can be subtracted from it and a model can be used to determine what signal to send to the actuator to produce the remaining forces. An application could, for example, request that a force of 1 N be applied to the user via haptic effect by bending the device outwards. Based on data provided by the deformation sensors, the controller is able to determine that the current deformation of the device should already produce a force of 0.2 N through natural haptic feedback. Therefore, the output instruction from the controller to the actuator instructs the actuator to produce only an additional 0.8 N of force. The compensated haptic effect delivered to the user feels to the user as though the device has had no resistance to the user's input forces.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A device comprising:
   a housing;
   a sensor configured to detect a contact force exerted on the housing;
   a controller communicatively coupled to the sensor, the controller configured to:
      determine a change in a haptic effect delivered at the housing caused by the contact force,
      determine a vibration compensation for the haptic effect to correct the change in the haptic effect delivered at the housing caused by the contact force,
      apply the vibration compensation to the haptic effect to create a compensated haptic effect, and
      generate an output instruction to deliver the compensated haptic effect; and
   an actuator configured to receive the output instruction and deliver the compensated haptic effect at the housing,
   wherein the vibration compensation is based on a vibration transmission model that is operable to evaluate changes in vibration transmission between the actuator and the sensor caused by the contact force.

2. The device of claim 1, wherein the sensor comprises a touch sensor.

3. The device of claim 2, wherein the touch sensor comprises a capacitive sensor, a force-sensitive resistor, a strain gauge or a piezoelectric sensor.

4. The device of claim 1, wherein the contact force indicates a location on the housing.

5. A device comprising:
   a housing;
   a first sensor configured to detect a contact force exerted on the housing;
   a second sensor configured to detect a deformation force created by deformation of the housing;

a controller communicatively coupled to the first and second sensors, the controller configured to determine a change in a haptic effect caused by both the contact force and the deformation force, the controller additionally configured to generate an output instruction to deliver the haptic effect as a compensated haptic effect, the compensated haptic effect operable to correct the change; and an actuator configured to receive the output instruction and deliver the compensated haptic effect at the housing.

6. The device of claim 5, wherein the deformation force indicates an amount of deformation of the housing, an angle of deformation of the housing, a pressure created by the deformation, or a change in temperature within the housing.

7. The device of claim 5, wherein the compensated haptic effect is additionally operable to correct the change in the haptic effect caused by natural haptic feedback of the housing.

8. The device of claim 5, wherein the first sensor comprises a touch sensor.

9. The device of claim 8, wherein the touch sensor comprises a capacitive sensor, a force-sensitive resistor, a strain gauge or a piezoelectric sensor.

10. The device of claim 5, wherein the contact force indicates a location on the housing.

11. The device of claim 5, wherein the compensated haptic effect includes vibration compensation.

12. The device of claim 11, where the vibration compensation is based on a vibration model operable to evaluate the change in frequency of vibration on the haptic effect caused by the contact force.

13. The device of claim 12, wherein the vibration model is operable to consider a starting point of the haptic effect in determining vibration compensation.

14. The device of claim 12, wherein the vibration model is operable to consider a location of the first sensor in determining vibration compensation.

15. A method for correcting haptic effects, comprising:
detecting a contact force exerted on a housing;
determining a first change in a haptic effect delivered at the housing caused by the contact force;
detecting a deformation force created by deformation of the housing;
determining a second change in the haptic effect to be delivered at the housing caused by the deformation force;
determining a compensation for the haptic effect to correct the first change in the haptic effect delivered at the housing caused by the contact force and the second change in the haptic effect delivered at the housing caused by the deformation force;
applying the compensation to the haptic effect to create a compensated haptic effect; and
delivering the compensated haptic effect at the housing.

16. The device of claim 1, wherein the vibration transmission model includes a transfer function that indicates attenuation or amplification of actuator vibration frequencies caused by the contact force.

17. The device of claim 1, wherein the vibration transmission model includes a lookup table that indicates attenuation or amplification of actuator vibration frequencies caused by the contact force.

18. The device of claim 1, further comprising a plurality of additional actuators delivering haptic effects at different locations, each additional actuator being associated with a different vibration transmission model.

* * * * *